*C. Arthur,*
*Dressing Stone.*
Nº 4,160.  Patented Aug. 26, 1845.

Fig: 2.

Fig: 3.

UNITED STATES PATENT OFFICE.

CHARLES ARTHUR, OF KEESEVILLE, NEW YORK.

TOOL FOR DRESSING GRINDSTONES.

Specification of Letters Patent No. 4,160, dated August 26, 1845.

*To all whom it may concern:*

Be it known that I, CHARLES ARTHUR, of Keeseville, in the county of Clinton and State of New York, have invented a useful tool for turning off and shaping grindstones used in nail-factories for grinding dies, also for turning off and making true the sides and periphery of grindstones for any and all uses; and I do hereby declare that the following is a full, clear, and exact description of the construction and operation of the same, reference being had to the annexed drawing, making a part of this specification, in which—

Figure 1:
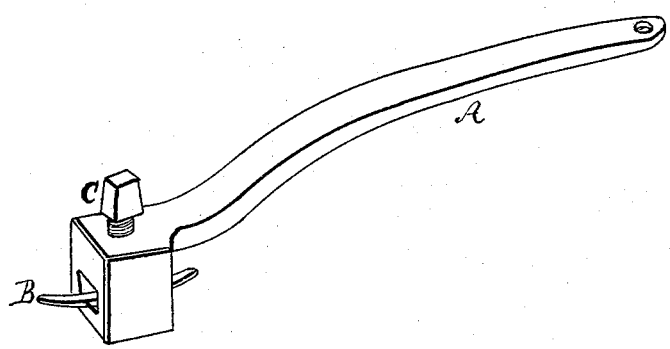
Figure 1:
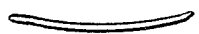
Figure 1:
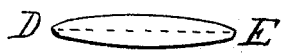

Figure 1 is a perspective view. A the handle or holder of the turning tool. B the turning tool which is simply a plate of elastic steel, having a spring temper; say of from three to five inches in length, from two-eighths to six-eighths of an inch wide, and one-sixteenth of an inch thick through the middle lengthwise and made slightly thinner toward each edge, the width to be adapted to the kind of turning off, of the stone intended to be accomplished, it being understood that the ends of the turning tool are to be either oval or straight or such other shape as may be desired to form the required surface to the periphery of the grind stone.

The tool should be held when turning, so as to point to the axle of the stone, making always a proper allowance for the spring of the tool. The elastic turning tool B, passes through a thin opening or socket in the end of the holder A, and is secured by the set screw C, say $\frac{3}{8}$ of an inch in diameter and one inch long with a half inch square head, passing perpendicularly through the center of the upper half of the socket part of the holder, by means of which, the turning tool B, is confined in its proper place and position, and the degree of its elasticity regulated by the greater or less projection of the same outside of the socket.

What I claim as my invention and desire to secure by Letters Patent is,

The employment of an elastic metal tool for cutting and turning off and shaping the periphery or sides of grindstones as above described, in any form or manner substantially as herein described, in which an elastic metal tool may be applied to that use.

CHARLES ARTHUR.

Witnesses:
 L. STETSON,
 RICHARD KEEN.